United States Patent
Rhoads et al.

(10) Patent No.: US 6,574,350 B1
(45) Date of Patent: *Jun. 3, 2003

(54) DIGITAL WATERMARKING EMPLOYING BOTH FRAIL AND ROBUST WATERMARKS

(75) Inventors: Geoffrey B. Rhoads, West Linn, OR (US); Ammon E. Gustafson, Beaverton, OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/498,223

(22) Filed: Feb. 3, 2000

Related U.S. Application Data

(63) Continuation-in-part of application No. 09/287,940, filed on Apr. 7, 1999, and a continuation of application No. 09/433,104, filed on Nov. 3, 1999, which is a continuation-in-part of application No. 09/442,440, filed on Nov. 17, 1999, which is a continuation of application No. 08/951,858, filed on Oct. 16, 1997, now Pat. No. 6,026,193, which is a continuation of application No. 08/436,134, filed on May 8, 1995, now Pat. No. 5,748,763, which is a continuation-in-part of application No. 09/234,780, filed on Jan. 20, 1999, now abandoned.

(60) Provisional application No. 60/082,228, filed on Apr. 16, 1998, and provisional application No. 60/071,983, filed on Jan. 20, 1998.

(51) Int. Cl.$^7$ .............................................. G06K 9/100
(52) U.S. Cl. ............................... 382/100; 380/51; 705/1
(58) Field of Search ................................. 382/100, 232, 382/162, 112, 218, 219, 233; 380/28, 232; 702/191; 705/1; 713/176; 372/201, 528; 358/296

(56) References Cited

U.S. PATENT DOCUMENTS

| | | | |
|---|---|---|---|
| 3,569,619 A | 3/1971 | Simjian | 235/380 |
| 3,984,624 A | 10/1976 | Waggener | 348/473 |
| 4,230,990 A | 10/1980 | Lert, Jr. et al. | 725/22 |
| 4,238,849 A | 12/1980 | Gassmann | 348/467 |
| 4,296,326 A | 10/1981 | Haslop et al. | 283/70 |
| 4,297,729 A | 10/1981 | Steynor et al. | 360/40 |

(List continued on next page.)

FOREIGN PATENT DOCUMENTS

| | | | |
|---|---|---|---|
| EP | 0789480 | 8/1997 | |
| EP | 0642060 B1 | 4/1999 | |
| WO | WO95/04665 | 2/1995 | |
| WO | WO97/43736 | 11/1997 | |
| WO | WO99/36876 | 7/1999 | 382/100 |
| WO | WO00/44131 | 7/2000 | |
| WO | WO 01/80169 | 10/2001 | 382/100 |

OTHER PUBLICATIONS

Cox et al., "Secure Spread Spectrum Watermarking for Images, Audio, and Video", IEEE–1996, pp. 243–246.*

Kundur et al., "A robust Digital Image Watermarking method and Wavelet–based Fusion", IEEE Jul. 1997, pp. 544–547.*

60/000442, Hudetz, Jun. 20, 1995.

60/082228, Rhoads, Apr. 16, 1998.

60/141763, Davis, Jun. 30, 1999.

60/158015, Davis et al., Oct. 6, 1999.

U.S. Application No. 09/314648, Rodriguez et al., filed May 19, 1999.

Brassil et al., Electronic Marking and Identification Techniques to Discourage Document Copying, Proceedings of INFOCOM '94 Conference on Computer, IEEE Commun. Soc Conference, Jun. 12–16, 1994, 1278–1287.

(List continued on next page.)

*Primary Examiner*—Jayanti K. Patel
(74) *Attorney, Agent, or Firm*—William Y. Conwell; Digimarc Corporation

(57) ABSTRACT

Image, video, or audio data is encoded with both a frail and a robust watermark. The two watermarks respond differently to different forms of processing (e.g., copying the object may render the frail watermark unreadable), permitting an original object to be distinguished from a processed object. Appropriate action can then taken in response thereto.

13 Claims, 3 Drawing Sheets

U.S. PATENT DOCUMENTS

| | | | |
|---|---|---|---|
| 4,313,197 A | 1/1982 | Maxemchuk | 370/210 |
| 4,367,488 A | 1/1983 | Leventer et al. | 370/204 |
| 4,379,947 A | 4/1983 | Warner | 370/204 |
| 4,380,027 A | 4/1983 | Leventer et al. | 348/467 |
| 4,395,600 A | 7/1983 | Lundy et al. | 381/73.1 |
| 4,425,642 A | 1/1984 | Moses et al. | 370/477 |
| 4,528,588 A | 7/1985 | Löfberg | 340/5.1 |
| 4,547,804 A | 10/1985 | Greenberg | 348/460 |
| 4,618,257 A | 10/1986 | Bayne et al. | 356/71 |
| 4,672,605 A | 6/1987 | Hustig et al. | 370/201 |
| 4,675,746 A | 6/1987 | Tetrick et al. | 358/296 |
| 4,739,377 A | 4/1988 | Allen | 355/133 |
| 4,750,173 A | 6/1988 | Bluthgen | 370/528 |
| 4,807,031 A | 2/1989 | Broughton et al. | 348/460 |
| 4,855,827 A | 8/1989 | Best | 348/485 |
| 4,879,747 A | 11/1989 | Leighton et al. | 713/186 |
| 4,888,798 A | 12/1989 | Earnest | 705/54 |
| 4,908,836 A | 3/1990 | Rushforth et al. | 375/152 |
| 4,908,873 A | 3/1990 | Philibert et al. | 382/100 |
| 4,944,036 A | 7/1990 | Hyatt | 367/43 |
| 4,947,028 A | 8/1990 | Gorog | 235/380 |
| 4,969,041 A | 11/1990 | O'Grady et al. | 348/473 |
| 4,972,476 A | 11/1990 | Nathans | 713/186 |
| 4,977,594 A | 12/1990 | Shear | 705/53 |
| 5,023,907 A | 6/1991 | Johnson | 710/200 |
| 5,027,401 A | 6/1991 | Soltesz | 380/54 |
| 5,040,059 A | 8/1991 | Leberl | 348/135 |
| 5,053,956 A | 10/1991 | Donald | 713/601 |
| 5,062,666 A | 11/1991 | Mowry et al. | 283/67 |
| 5,095,196 A | 3/1992 | Miyata | 235/382 |
| 5,103,459 A | 4/1992 | Gilhousen et al. | 370/206 |
| 5,113,445 A | 5/1992 | Wang | 380/51 |
| 5,146,457 A | 9/1992 | Veldhuis et al. | 370/523 |
| 5,181,786 A | 1/1993 | Hujink | 400/61 |
| 5,200,822 A | 4/1993 | Bronfin et al. | 725/22 |
| 5,213,337 A | 5/1993 | Sherman | 463/40 |
| 5,216,724 A | 6/1993 | Suzuki et al. | 382/135 |
| 5,243,423 A | 9/1993 | DeJean et al. | 348/473 |
| 5,259,025 A | 11/1993 | Monroe | 705/75 |
| 5,280,537 A | 1/1994 | Sugiyama et al. | 370/529 |
| 5,288,976 A | 2/1994 | Citron | 235/375 |
| 5,291,243 A | 3/1994 | Heckman et al. | 399/3 |
| 5,295,203 A | 3/1994 | Krause et al. | 382/248 |
| 5,315,098 A | 5/1994 | Tow | 235/494 |
| 5,321,470 A | 6/1994 | Hasuo et al. | 399/366 |
| 5,374,976 A | 12/1994 | Spannenburg | 399/366 |
| 5,379,345 A | 1/1995 | Greenberg | 455/2.01 |
| 5,416,307 A | 5/1995 | Danek et al. | 235/449 |
| 5,428,607 A | 6/1995 | Hiller et al. | 370/352 |
| 5,428,731 A | 6/1995 | Powers | 707/501.1 |
| 5,463,209 A | 10/1995 | Figh | 235/383 |
| 5,469,222 A | 11/1995 | Sprague | 348/580 |
| 5,469,506 A | 11/1995 | Berson et al. | 713/186 |
| 5,493,677 A | 2/1996 | Bfalogh | 707/104.1 |
| 5,495,581 A | 2/1996 | Tsai | 707/526 |
| 5,496,071 A | 3/1996 | Walsh | 283/70 |
| 5,502,576 A | 3/1996 | Ramsay et al. | 358/444 |
| 5,521,722 A | 5/1996 | Colvill et al. | 358/500 |
| 5,530,759 A | 6/1996 | Braudaway et al. | 380/54 |
| 5,530,852 A | 6/1996 | Meske, Jr. et al. | 709/206 |
| 5,568,550 A | 10/1996 | Ur | 382/306 |
| 5,594,226 A | 1/1997 | Steger | 235/379 |
| 5,598,526 A | 1/1997 | Daniel et al. | 345/540 |
| 5,613,004 A | 3/1997 | Cooperman et al. | 380/28 |
| 5,617,119 A | 4/1997 | Briggs et al. | 707/100 |
| 5,636,292 A | 6/1997 | Rhoads | 382/232 |
| 5,638,443 A | 6/1997 | Stefik | 705/54 |
| 5,640,193 A | 6/1997 | Wellner | 725/100 |
| 5,646,999 A | 7/1997 | Saito | 705/54 |
| 5,652,626 A | 7/1997 | Kawakami et al. | 348/463 |
| 5,659,164 A | 8/1997 | Schmid | 235/375 |
| 5,663,766 A | 9/1997 | Sizer, II | 348/473 |
| 5,664,018 A | 9/1997 | Leighton | 380/54 |
| 5,665,951 A | 9/1997 | Newman et al. | 235/375 |
| 5,668,636 A | 9/1997 | Beach et al. | 358/296 |
| 5,671,282 A | 9/1997 | Wolff et al. | 713/179 |
| 5,673,316 A | 9/1997 | Auerbach et al. | 705/51 |
| 5,687,236 A | 11/1997 | Moskowitz et al. | 380/28 |
| 5,710,636 A | 1/1998 | Curry | 358/3.28 |
| 5,719,939 A | 2/1998 | Tel | 713/179 |
| 5,721,788 A | 2/1998 | Powell et al. | 382/100 |
| 5,727,092 A | 3/1998 | Sandford, II et al. | 382/251 |
| 5,735,547 A | 4/1998 | Morelle et al. | 283/67 |
| 5,740,244 A | 4/1998 | Indeck et al. | 713/176 |
| 5,742,845 A | 4/1998 | Wagner | 395/821 |
| 5,745,604 A | 4/1998 | Rhoads | 382/232 |
| 5,761,686 A | 6/1998 | Bloomberg | 707/529 |
| 5,768,426 A | 6/1998 | Rhoads | 382/232 |
| 5,778,102 A | 7/1998 | Sandford, II et al. | 382/251 |
| 5,790,693 A | 8/1998 | Graves et al. | 382/135 |
| 5,790,697 A | 8/1998 | Munro et al. | 382/135 |
| 5,804,803 A | 9/1998 | Cragun et al. | 235/375 |
| 5,809,160 A | 9/1998 | Powell et al. | 382/100 |
| 5,809,317 A | 9/1998 | Kogan et al. | 707/501.1 |
| 5,817,205 A | 10/1998 | Kaule | 382/294 |
| 5,818,441 A | 10/1998 | Throckmorton et al. | 345/717 |
| 5,819,289 A | 10/1998 | Sanford, II et al. | 707/104.1 |
| 5,825,871 A | 10/1998 | Mark | 379/357.03 |
| 5,825,892 A | 10/1998 | Braudaway et al. | 380/51 |
| 5,838,458 A | 11/1998 | Tsai | 358/402 |
| 5,841,978 A | 11/1998 | Rhoads | 709/217 |
| 5,848,144 A | 12/1998 | Ahrens | 379/219 |
| 5,848,413 A | 12/1998 | Wolff | 707/10 |
| 5,852,673 A | 12/1998 | Young | 382/164 |
| 5,857,038 A | 1/1999 | Owada et al. | 382/284 |
| 5,862,218 A | 1/1999 | Steinberg | 713/176 |
| 5,862,260 A | 1/1999 | Rhoads | 382/232 |
| 5,869,819 A | 2/1999 | Knowles et al. | 235/375 |
| 5,871,615 A | 2/1999 | Harris | 162/140 |
| 5,872,589 A | 2/1999 | Morales | 725/24 |
| 5,875,249 A | 2/1999 | Mintzer et al. | 380/54 |
| 5,893,101 A | 4/1999 | Balogh et al. | 707/100 |
| 5,898,779 A | 4/1999 | Squilla et al. | 713/176 |
| 5,900,608 A | 5/1999 | Iida | 235/381 |
| 5,902,353 A | 5/1999 | Reber et al. | 709/219 |
| 5,903,729 A | 5/1999 | Reber et al. | 709/219 |
| 5,905,248 A | 5/1999 | Russell et al. | 235/462.15 |
| 5,905,251 A | 5/1999 | Knowles | 235/472.01 |
| 5,905,810 A | 5/1999 | Jones et al. | 382/135 |
| 5,913,210 A | 6/1999 | Call | 707/4 |
| 5,915,027 A | 6/1999 | Cox et al. | 380/54 |
| 5,930,369 A * | 7/1999 | Cox et al. | 380/54 |
| 5,930,767 A | 7/1999 | Reber et al. | 705/26 |
| 5,932,863 A | 8/1999 | Rathus et al. | 235/462.15 |
| 5,933,798 A | 8/1999 | Linnartz | 702/91 |
| 5,933,829 A | 8/1999 | Durst et al. | 707/10 |
| 5,938,726 A | 8/1999 | Reber et al. | 709/217 |
| 5,938,727 A | 8/1999 | Ikeda | 709/218 |
| 5,939,695 A | 8/1999 | Nelson | 235/383 |
| 5,940,595 A | 8/1999 | Reber et al. | 709/227 |
| 5,943,422 A * | 8/1999 | Van Wie et al. | 380/9 |
| 5,949,055 A | 9/1999 | Fleet et al. | 235/469 |
| 5,950,173 A | 9/1999 | Perkowski | 705/26 |
| 5,963,916 A | 10/1999 | Kaplan | 705/26 |
| 5,971,277 A | 10/1999 | Cragun et al. | 235/462.01 |
| 5,974,141 A | 10/1999 | Saito | 705/52 |
| 5,974,548 A | 10/1999 | Adams | 713/200 |
| 5,978,773 A | 11/1999 | Hudetz et al. | 705/23 |
| 5,979,757 A | 11/1999 | Tracy et al. | 235/383 |
| 5,983,218 A | 11/1999 | Syeda-Mahmoo | 707/3 |
| 5,991,426 A | 11/1999 | Cox et al. | 382/100 |

| | | | |
|---|---|---|---|
| 6,005,501 A | 12/1999 | Wolosewicz | 341/52 |
| 6,035,177 A | 3/2000 | Moses et al. | 725/22 |
| 6,052,486 A | 4/2000 | Knowlton et al. | 382/232 |
| 6,064,764 A | 5/2000 | Bhaskaran et al. | 382/183 |
| 6,122,403 A | 9/2000 | Rhoads | 382/233 |
| 6,324,574 B1 | 9/2000 | Rhoads | 709/218 |
| 6,166,750 A | 12/2000 | Negishi | 347/131 |
| 6,233,684 B1 | 5/2001 | Stefik et al. | 713/176 |
| 6,246,777 B1 | 6/2001 | Agarwal et al. | 382/100 |
| 6,266,430 B1 | 7/2001 | Rhoads et al. | 382/100 |
| 6,272,634 B1 * | 8/2001 | Tewfik et al. | 713/176 |
| 6,275,599 B1 | 8/2001 | Adler et al. | 382/100 |
| 6,285,775 B1 | 9/2001 | Wu et al. | 382/100 |
| 6,311,214 B1 | 10/2001 | Rhoads | 709/217 |
| 6,332,194 B1 | 12/2001 | Bloom et al. | 709/223 |
| 6,334,187 B1 | 12/2001 | Kadono | 713/176 |
| 2001/0020270 A1 | 9/2001 | Yeung et al. | 713/176 |
| 2002/0009208 A1 | 1/2002 | Alattar et al. | 382/100 |
| 2002/0010684 A1 | 1/2002 | Moskowitz | 765/75 |

OTHER PUBLICATIONS

Bruckstein, A.M.; Richardson, T.J., A holographic transform domain image watermarking method, Circuits, Systems, and Signal Processing vol. 17, No. 3, p. 361–89, 1998. This paper includes an appendix containing an internal memo of Bell Labs, which according to the authors of the paper, was dated Sep. 1994.

"High Water FBI Limited Presentation Image Copyright Protection Software," FBI Ltd brochure, Jul., 1995, 17 pages.

Koch et al., "Copyright Protection for Multimedia Data," Fraunhofer Institute for Computer Graphics, Dec. 16, 1994, 15 pages.

Koch et al., "Towards Robust and Hidden Image Copyright Labeling," Proc. of 1995 IEEE Workshop on Nonlinear Signal and Image Processing, Jun. 20–22, 1995, 4 pages.

Kurak et al., "A Cautionary Note On Image Downgrading," 1992 IEEE, pp. 153–159.

Mintzer et al., "Safeguarding Digital library Contents and Users" Digital Watermarking, D–Lib Magazine, Dec. 1997: ISSN 1082–9873.

Rindfrey, "Towards and Equitable System for Access Control and Copyright Protection in Broadcast Image Services: The Equicrypt Approach," Intellectual Property Rights and New Technologies, Proc. of the Conference, R. Oldenbourg Verlag Wien Munchen 1995, 12 pages.

Schreiber et al., "A Compatible High–Definition Television System Using the Noise–Margin Method of Hiding Enhancement Information," SMPTE Journal, Dec. 1989, pp. 873–879.

SDMI Example Use Scenarios (Non–Exhaustive), Version 1.2, Jun. 16, 1999.

Szepanski, "A Signal Theoretic Method for Creating Forgery–Proof Documents for Automatic Verification," Proceedings 1979 Carnahan Conference on Crime Countermeasures, May 16, 1979, pp. 101–109.

Szepanski, "Additive Binary Data Transmission for Video Signals," Papers Presented at Conf. Of Comm. Engineering Soc. Sep. 30–Oct. 3, 1980, Technical Reports vol. 74, pp. 342–352.

Tanaka et al., "A Visual Retrieval Sysem with Private Information for Image Database," Proceeding International Conference on DSP Applications and Technology, Oct. 1991, pp. 415–421.

Tanaka et al., "New Integrated Coding Schemes for Computer–Aided Facsimile," Proc. IEEE Int'l Conf. on Sys. Integration, Apr. 1990, pp. 275–281.

Tirkel et al, "Electronic Water Mark," DICTA–93, Macquarie University, Sydney, Australia, Dec., 1993, pp. 666–673.

Weber et al., "Correlative Image Registration," Seminars in Nuclear Magazine, vol. XXIV, No. 4, Oct., 1994, pp. 311–323.

U.S. Pat. application No. 09/765,102, filed Jan. 17, 2001, Shaw, 382/199.

U.S. Pat. application No. 09/761,349, filed Jan. 16, 2001, Rhoads, 382/100.

U.S. Pat. application No. 09/761,280, filed Jan. 16, 2001, Rhoads, 382/100.

U.S. Pat. application No. 09/645,779, filed Aug. 24, 2000, Tian et al., 382/100.

U.S. Pat. application No. 09/689,226, filed Oct. 11, 2000, Brunk, 382/100.

U.S. Pat. application No. 09/689,250, filed Oct. 11, 2000, Ahmed, 382/100.

U.S. Pat. application No. 09/689,293, filed Oct. 11, 2000, Tian et al., 382/100.

U.S. Pat. application No. 09/625,577, filed Jul. 25, 2000, Carr et al., 382/100.

U.S. Pat. application No. 09/574,726, filed May 18, 2000, Rhoads et al., 382/100.

U.S. Pat. application No. 09/562,524, filed May 1, 2000, Carr et al., 382/100.

U.S. Pat. application No. 09/498,223, filed Feb. 3, 2000, Rhoads et al., 382/100.

U.S. Pat. application No. 09/465,418, filed Dec. 16, 1999, Rhoads et al., 382/100.

U.S. Pat. application No. 09/431,990, filed Nov. 3, 1999, Rhoads, 380/54.

U.S. Pat. application No. 09/428,359, filed Oct. 28, 2000, Davis et al., 382/100.

U.S. Pat. application No. 09/342,972, filed Jun. 29, 1999, Rhoads, 382/100.

U.S. Pat. application No. 09/293,602, filed Apr. 15, 1999, Rhoads, 382/100.

U.S. Pat. application No. 09/293,601, filed Apr. 15, 1999, Rhoads, 382/135.

U.S. Pat. application No. 09/287,940, filed Apr. 7, 1999, Rhoads, 382/100.

U.S. Pat. application No. 09/185,380, filed Nov. 3, 1998, Davis et al., 382/100.

U.S. Pat. application No. 09/074,034, filed May 6, 1998, Rhoads, 382/100.

U.S. Pat. application No. 09/127,502, filed Jul. 31, 1998, Rhoads, 382/100.

U.S. Pat. application No. 60/082,228, filed Apr. 16, 1998, Rhaods.

U.S. Pat. application No. 60/198,138, filed Apr. 17, 2000, Alattar.

Audio Watermarking Architectures for Secure Digital Music Distribution, A Proposal to the SDMI Portable Devices Working Group by ARIS Technologies, Inc, Mar. 26, 1999, pp. 1–11.

Audio Watermarking Architectures for Persistent Protection, Presentation to SDMI PDWG, Mar. 29, 1999, J. Winograd, Aris Technologies, pp. 1–16.

Audio Watermarking System to Screen Digital Audio Content for LCM Acceptance, A Proposal Submitted in Response to PDWG99050504–Transitio CfP by ARIS Technologies, Inc., May 23, 1999, Document Version 1.0, 15 pages.

Boland et al., "Watermarking Digital Images for Copyright Protection", *Fifth Int'l Conference on Image Processing and it's Application*, Jul. 1995, pp. 326–330.

Levy, "AIPL's Proposal for SDMI: An Underlying Security System" (slide presentation), Mar. 29, 1999, 23 slides..

Microsoft Response to CfP for Technology Solutions to Screen Digital Audio Content for LCM Acceptance, SDMI, PDWG Tokyo, May 23, 1999, 9 pages.

Response to CfP for Technology Solutions to Screen Digital Audio Content for LCM Acceptance, NTT Waveless Radio Consotium, May 23, 1999, 9 pages.

Sandford II et al., "The Data Embedding Method", *Proceedings of the SPIE* vol. 2615, pp. 226–259, 1996.

Thomas, Keith, *Screening Technology for Content from Compact Discs*, May 24, 1999, 11 pages.

Tirkel et al., "Electronic Water Mark," *Dicta–93*, Marquarie University, Sydney, Australia, Dec., 1993, pp. 666–672.

Vidal et al., "Non–Noticeable Information Embedding in Color Images: Marking and Detection", *IEEE* 1999, pp. 293–297.

Wolfgang et al., "A Watermark for Digital Images," *Computer Vision and Image Processing Laboratory*, Purdue University, Sep. 1996, pp. 219–222.

Szepanski, "A Signal Theoretic Method for Creating Forgery–Proof Documents for Automatic Verification," Proceedings 1979 Carnahan Conference on Crime Countermeasures, May 16, 1979, pp. 101–109.

Dautzenberg, "Watermarking Images," Department of Microelectronics and Electrical Engineering, Trinity College Dublin, 47 pages, Oct. 1994.

Szepanski, "Additive Binary Data Transmission for Video Signals," Conference of the Communications Engineering Society, 1980, NTG Technical Reports, vol. 74, pp. 343–351. (German text and English translation enclosed).

U.S. Pat. No. 60/071,983, filed Jan. 20, 1998, Levy.

U.S. Pat. No. 09/404,291, filed Sep. 23, 1999, Levy, 713/176.

U.S. Pat. No. 60/114,725, filed Dec. 31, 1998, Levy.

U.S. Pat. No. 09/234,780, filed Jan. 20, 1999, Rhoads et al., 382/100.

U.S. Pat. No. 60/116,641, filed Jan. 21, 1999, Cookson.

U.S. Pat. No. 09/478,713, filed Jan. 6, 2000, Cookson, 706/057.

Cookson, Chris, General Principles of Music Uses on Portable Devices, presented to SDMI, Mar. 5, 1999.

Winograd, J.M., "Audio Watermarking Architecture for Secure Digital Music Distribution," a Proposal to the SDMI Portable Devices Working Group, by Aris Technologies, Inc., Mar. 26, 1999.

Mintzer et al., "Safeguarding Digital Library Contents and Users: Digital Watermarking," D–Lib Magazine, Dec. 1997, 12 pages.

Szepanski, "A Signal Theoretic Method for Creating Forgery–Proof Documents for Automatic Verifications," Proceedings 1979 Carnahan Conference on Crime Countermeasures, May 16, 1979, pp. 101–109.

Dautzenberg, "Watermarking Images," Department of Microelectronics and Electrical Engineering, Trinity College Dublin, 47 pages, Oct. 1994.

Szepanski, "Additive Binary Data Transmission for Video Signals," Conference of the Communications Engineering Society, 1980, NTG Technical Reports, vol. 74, pp. 343–351. (German text and English translation enclosed).

* cited by examiner

DIGITAL WATERMARKING EMPLOYING BOTH FRAIL AND ROBUST WATERMARKS

RELATED APPLICATION DATA

This application is a continuation-in-part of application Ser. No. 09/287,940, filed Apr. 7, 1999, which claims priority to abandoned application No. 60/082,228, filed Apr. 16, 1998. This application is also a continuation of application Ser. No. 09/433,104, filed Nov. 3, 1999, which is a continuation-in-part of application Ser. No. 09/234,780, filed Jan. 20, 1999, which claims priority to abandoned application No. 60/071,983, filed Jan. 20, 1998. These applications are incorporated herein by reference.

This application is also a continuation-in-part of application Ser. No. 09/442,440, filed Nov. 17, 1999, which is a continuation of application Ser. No. 08/951,858, filed Oct. 16, 1997 (now U.S. Pat. No. 6,026,193), which is a continuation of application Ser. No. 08/436,134, filed May 8, 1995 (now U.S. Pat. No. 5,748,763).

FIELD OF THE INVENTION

The present application relates to digital watermarking, and particularly relates to digital watermarking techniques employing both frail and robust watermarks.

BACKGROUND AND SUMMARY OF THE INVENTION

For expository convenience, the following discussion focuses on an exemplary application of the disclosed technology—encoding the images printed on banknotes with both frail and robust watermarks. As noted later, however, the technology also finds application beyond image watermarking, including in video and audio watermarking.

The problem of casual counterfeiting of banknotes first arose two decades ago, with the introduction of color photocopiers. A number of techniques were proposed to address the problem.

U.S. Pat. No. 5,659,628 (assigned to Ricoh) is one of several patents noting that photocopiers can be equipped to recognize banknotes and prevent their photocopying. The Ricoh patent particularly proposed that the red seal printed on Japanese yen notes is a pattern well-suited for machine recognition. U.S. Pat. No. 5,845,008 (assigned to Omron), and U.S. Pat. Nos. 5,724,154 and 5,731,880 (both assigned to Canon) show other photocopiers that sense the presence of the seal emblem on banknotes, and disable a photocopier in response.

Other technologies proposed that counterfeiting might be deterred by uniquely marking the printed output from each color photocopier, so that copies could be traced back to the originating machine. U.S. Pat. No. 5,568,268, for example, discloses the addition of essentially-imperceptible patterns of yellow dots to printed output; the pattern is unique to the machine. U.S. Pat. No. 5,557,742 discloses a related arrangement in which the photocopier's serial number is printed on output documents, again in essentially-imperceptible form (small yellow lettering). U.S. Pat. No. 5,661,574 shows an arrangement in which bits comprising the photocopier's serial number are represented in the photocopier's printed output by incrementing, or decrementing, pixel values (e.g. yellow pixels) at known locations by fixed amounts (e.g. +/−30), depending on whether the corresponding serial number bit is a "1" or a "0."

Recent advances in color printing technology have greatly increased the level of casual counterfeiting. High quality scanners are now readily available to many computer users, with 300 dpi scanners available for under $100, and 600 dpi scanners available for marginally more. Similarly, photographic quality color ink-jet printers are commonly available from Hewlett-Packard Co., Epson, etc. for under $300.

These tools pose new threats. For example, a banknote can be doctored (e.g. by white-out, scissors, or less crude techniques) to remove/obliterate the visible patterns on which prior art banknote detection techniques relied to prevent counterfeiting. Such a doctored document can then be freely scanned or copied, even on photocopiers designed to prevent processing of banknote images. The removed pattern(s) can then be added back in, e.g. by use of digital image editing tools, permitting free reproduction of the banknote.

In accordance with aspects of the present invention, these and other current threats are addressed by digitally watermarking banknotes, and equipping devices to sense such watermarks and respond accordingly.

(Watermarking is a quickly growing field of endeavor, with several different approaches. The present assignee's work is reflected in the earlier-cited related applications, as well as in U.S. Pat. Nos. 5,841,978, 5,748,783, 5,710,834, 5,636,292, 5,721,788, and laid-open PCT application WO97/43736. Other work is illustrated by U.S. Pat. Nos. 5,734,752, 5,646,997, 5,659,726, 5,664,018, 5,671,277, 5,687,191, 5,687,236, 5,689,587, 5,568,570, 5,572,247, 5,574,962, 5,579,124, 5,581,500, 5,613,004, 5,629,770, 5,461,426, 5,743,631, 5,488,664, 5,530,759, 5,539,735, 4,943,973, 5,337,361, 5,404,160, 5,404,377, 5,315,098, 5,319,735, 5,337,362, 4,972,471, 5,161,210, 5,243,423, 5,091,966, 5,113,437, 4,939,515, 5,374,976, 4,855,827, 4,876,617, 4,939,515, 4,963,998, 4,969,041, and published foreign applications WO 98/02864, EP 822,550, WO 97/39410, WO 96/36163, GB 2,196,167, EP 777,197, EP 736,860, EP 705,025, EP 766,468, EP 782,322, WO 95/20291, WO 96/26494, WO 96/36935, WO 96/42151, WO 97/22206, WO 97/26733. Some of the foregoing patents relate to visible watermarking techniques. Other visible watermarking techniques (e.g. data glyphs) are described in U.S. Pat. Nos. 5,706,364, 5,689,620, 5,684,885, 5,680,223, 5,668,636, 5,640,647, 5,594,809.

Most of the work in watermarking, however, is not in the patent literature but rather in published research. In addition to the patentees of the foregoing patents, some of the other workers in this field (whose watermark-related writings can by found by an author search in the INSPEC database) include I. Pitas, Eckhard Koch, Jian Zhao, Norishige Morimoto, Laurence Boney, Kineo Matsui, A. Z. Tirkel, Fred Mintzer, B. Macq, Ahmed H. Tewfik, Frederic Jordan, Naohisa Komatsu, and Lawrence O'Gorman.

The artisan is assumed to be familiar with the foregoing prior art.

In the present disclosure it should be understood that references to watermarking encompass not only the assignee's watermarking technology, but can likewise be practiced with any other watermarking technology, such as those indicated above.

The physical manifestation of watermarked information most commonly takes the form of altered signal values, such as slightly changed pixel values, picture luminance, picture colors, DCT coefficients, instantaneous audio amplitudes, etc. However, a watermark can also be manifested in other ways, such as changes in the surface microtopology of a medium, localized chemical changes (e.g. in photographic emulsions), localized variations in optical density, localized changes in luminescence, etc. Watermarks can also be optically implemented in holograms and conventional paper watermarks.)

In accordance with an exemplary embodiment of the present invention, an object—such as a banknote image—is encoded with two watermarks. One is relatively robust, and withstands various types of corruption, and is detectable in the object even after multiple generations of intervening distortion. The other is relatively frail, so that it fails with the first distortion. If a version of the object is encountered having the robust watermark but not the frail watermark, the object can be inferred to have been processed, and thus not an original.

The foregoing and other features and advantages of the present invention will be more readily apparent from the following Detailed Description, which proceeds with reference to the accompanying drawings.

DETAILED DESCRIPTION

Watermarks in banknotes and other security documents (passports, stock certificates, checks, etc.—all collectively referred to as banknotes herein) offer great promise to reduce such counterfeiting, as discussed more fully below. Additionally, watermarks provide a high-confidence technique for banknote authentication.

Figure 1:
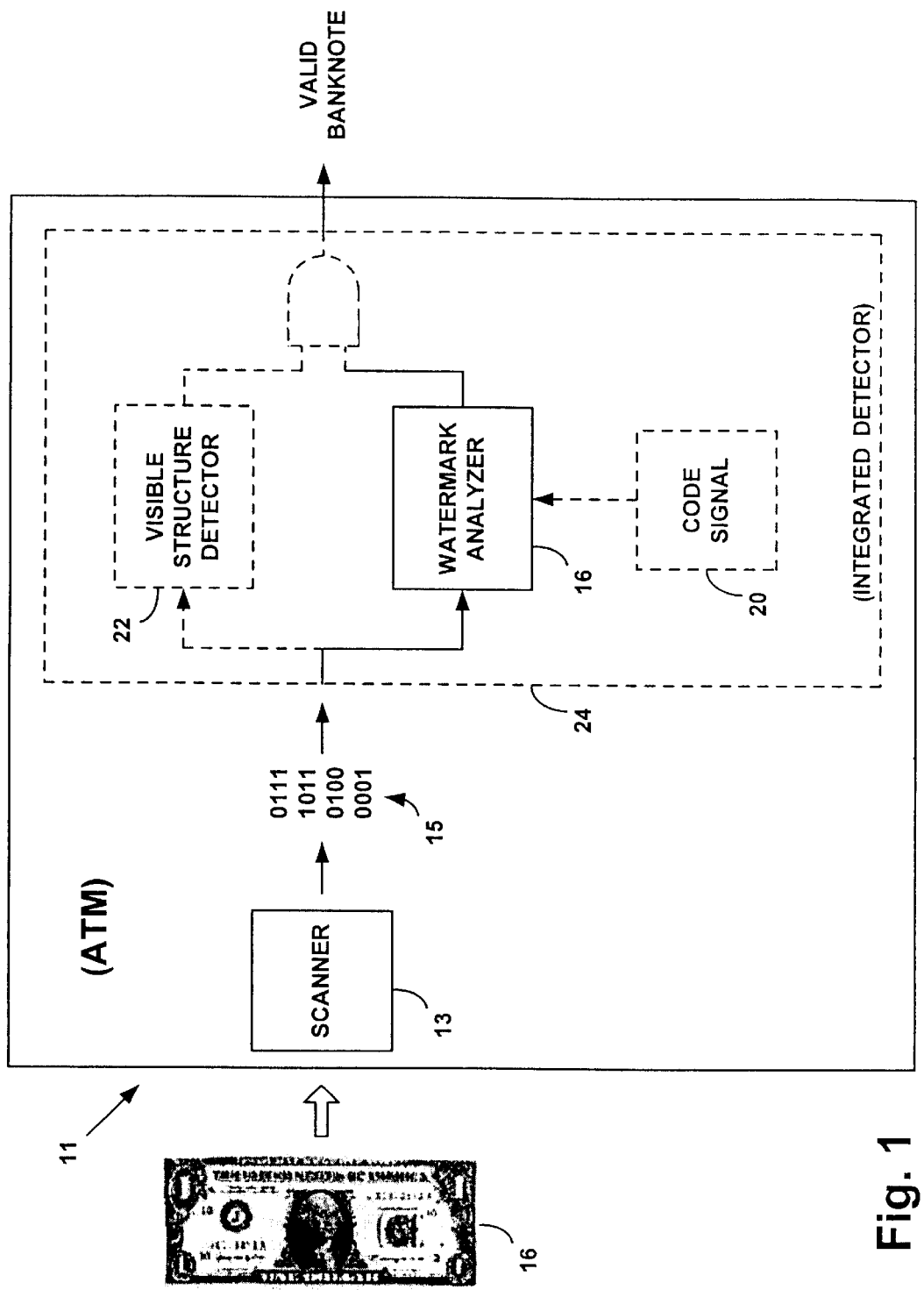
FIG. 1 shows part of an automatic teller machine employing principles of the present invention.

By way of example, consider an automatic teller machine that uses watermark data to provide high confidence authentication of banknotes, permitting it to accept—as well as dispense—cash. Referring to FIG. 1, such a machine (11) is provided with a known optical scanner (13) to produce digital data (15) corresponding to the face(s) of the bill (16). This image set (14) is then analyzed (16) to extract embedded watermark data. In watermarking technologies that require knowledge of a code signal (20) for decoding (e.g. noise modulation signal, crypto key, spreading signal, etc.), a bill may be watermarked in accordance with several such codes. Some of these codes are public—permitting their reading by conventional machines. Others are private, and are reserved for use by government agencies and the like. (C.f. public and private codes in the present assignee's issued patents.)

As noted, banknotes presently include certain visible structures, or markings (e.g., the seal emblem noted in the earlier-cited patents), which can be used as aids to note authentication (either by visual inspection or by machine detection). Desirably, a note is examined by an integrated detection system (24), for both such visible structures (22), as well as the present watermark-embedded data, to determine authenticity.

The visible structures can be sensed using known pattern recognition techniques. Examples of such techniques are disclosed in U.S. Pat. Nos. 5,321,773, 5,390,259, 5,533,144, 5,539,841, 5,583,614, 5,633,952, 4,723,149 and 5,424,807 and laid-open foreign application EP 766,449. The embedded watermark data can be recovered using the scanning/analysis techniques disclosed in the cited patents and publications.

Figure 2:
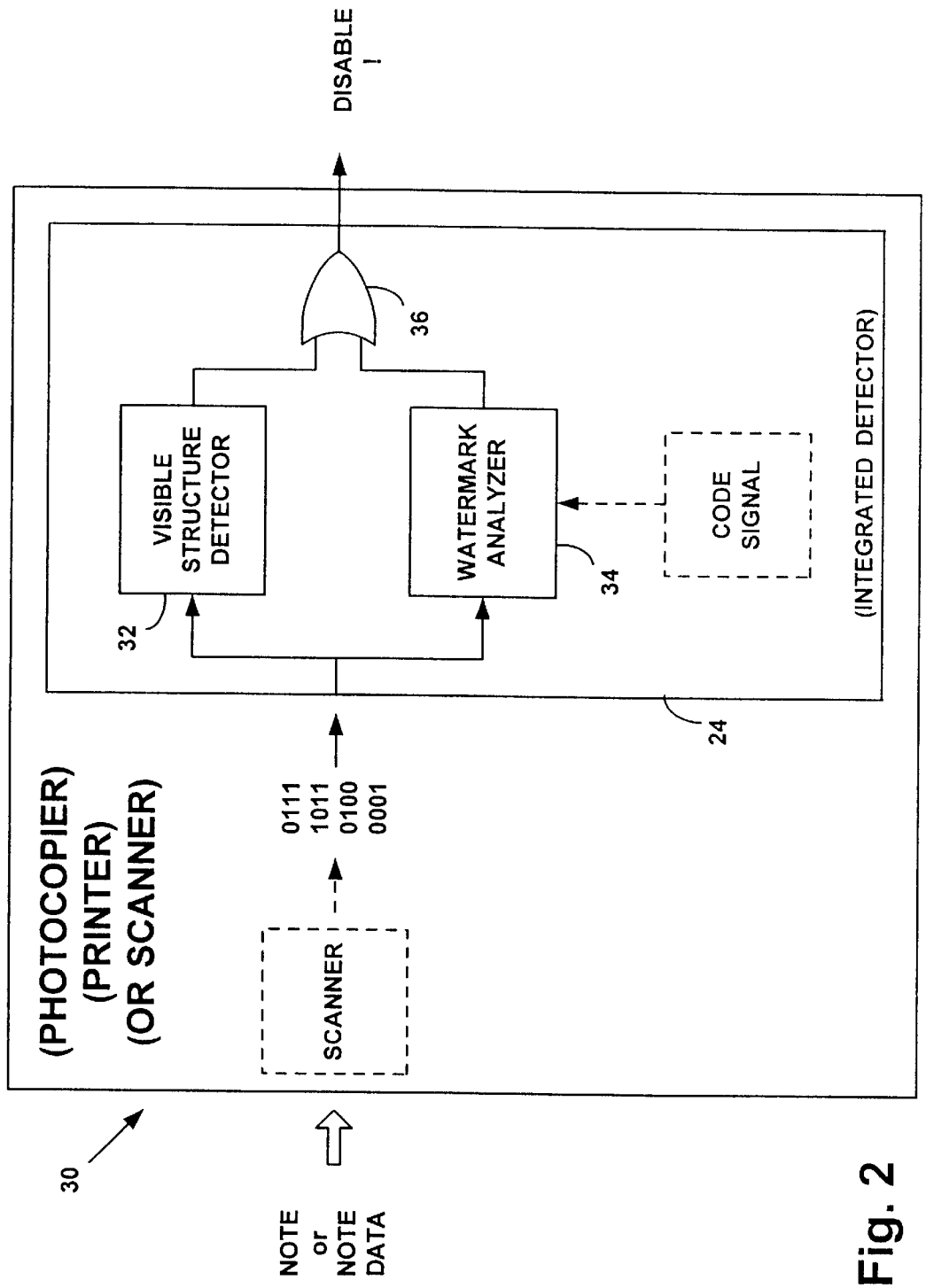
FIG. 2 shows part of a device (e.g. a photocopier, scanner, or printer) employing principles of the present invention.

To reduce counterfeiting, it is desirable that document-reproducing technologies recognize banknotes and refuse to reproduce same. Referring to FIG. 2, a photocopier (30), for example, can sense the presence of either a visible structure (32) or embedded banknote watermark data (34), and disable copying if either is present (36). Scanners and printers can be equipped with a similar capability—analyzing the data scanned or to be printed for either of these banknote hallmarks. If either is detected, the software (or hardware) disables further operation.

The watermark detection criteria provides an important advantage not otherwise available. As noted, an original bill can be doctored (e.g. by white-out, scissors, or less crude techniques) to remove/obliterate the visible structures. Such a document can then be freely copied on either a visible structure-sensing photocopier or scanner/printer installation. The removed visible structure can then be added in via a second printing/photocopying operation. If the printer is not equipped with banknote-disabling capabilities, image-editing tools can be used to insert visible structures back into image data sets scanned from such doctored bills, and the complete bill freely printed. By additionally including embedded watermark data in the banknote, and sensing same, such ruses will not succeed.

(A similar ruse is to scan a banknote image on a non-banknote-sensing scanner. The resulting image set can then be edited by conventional image editing tools to remove/obliterate the visible structures. Such a data set can then be printed—even on a printer/photocopier that examines such data for the presence of visible structures. Again, the missing visible structures can be inserted by a subsequent printing/photocopying operation.)

Desirably, the visible structure detector and the watermark detector are integrated together as a single hardware and/or software tool. This arrangement provides various economies, e.g., in interfacing with the scanner, manipulating pixel data sets for pattern recognition and watermark extraction, electronically re-registering the image to facilitate pattern recognition/watermark extraction, issuing control signals (e.g. disabling) signals to the photocopier/scanner, etc.

Figure 3:
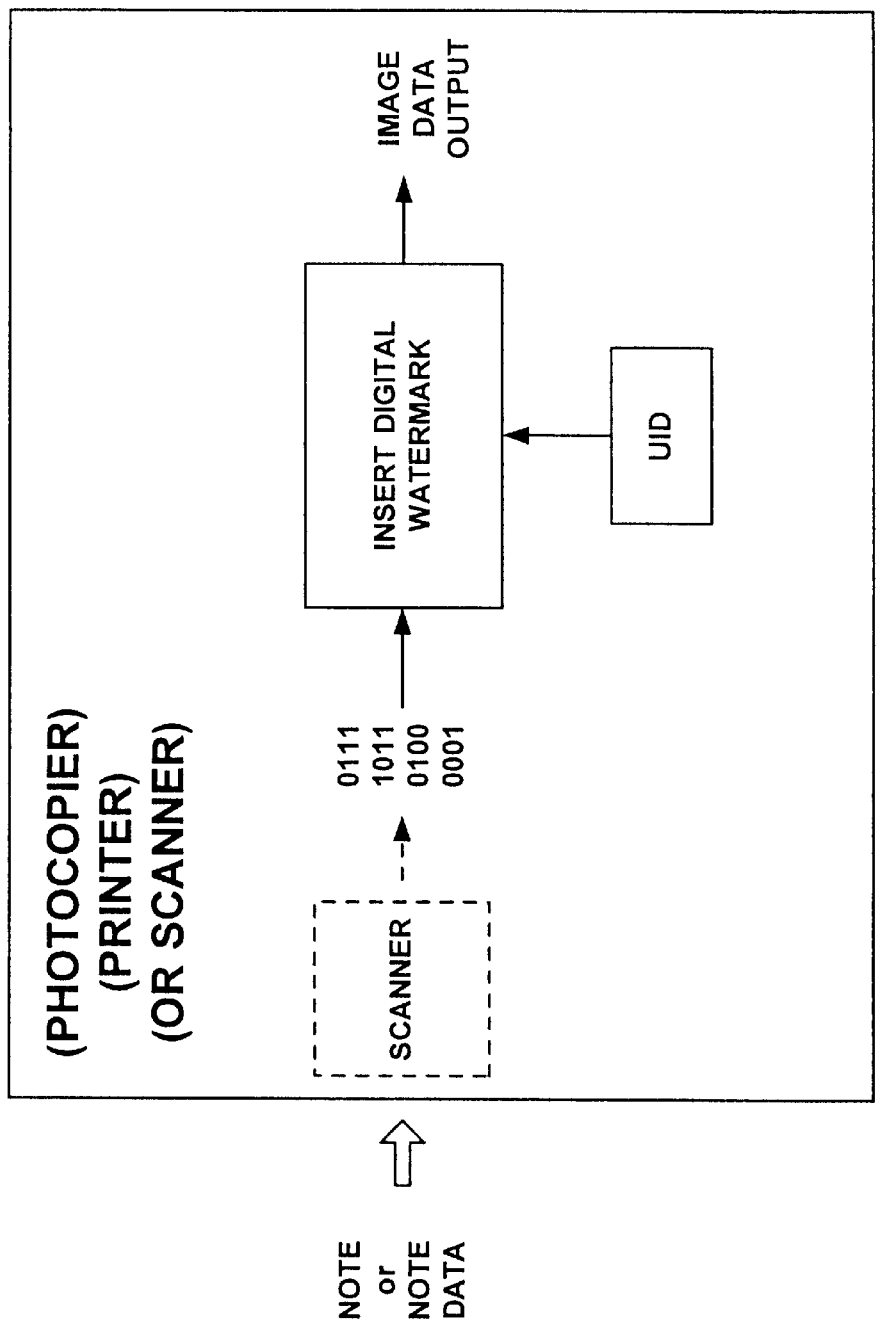
FIG. 3 shows part of another device employing principles of the present invention.

A related principle (FIG. 3) is to insert an imperceptible watermark having a universal ID (UID) into all documents printed with a printer, scanned with a scanner, or reproduced by a photocopier. The UID is associated with the particular printer/photocopier/scanner in a registry database maintained by the products' manufacturers. The manufacturer can also enter in this database the name of the distributor to whom the product was initially shipped. Still further, the owner's name and address can be added to the database when the machine is registered for warranty service. While not preventing use of such machines in counterfeiting, the embedded UID facilitates identifying the machine that generated a counterfeit banknote. (This is an application in which a private watermark might best be used.)

While the foregoing applications disabled potential counterfeiting operations upon the detection of either a visible structure or watermarked data, in other applications, both criteria must be met before a banknote is recognized as genuine. Such applications typically involve the receipt or acceptance of banknotes, e.g. by ATMs as discussed above and illustrated in FIG. 1.

The foregoing principles (employing just watermark data, or in conjunction with visible indicia) can likewise be used to prevent counterfeiting of tags and labels (e.g. the fake labels and tags commonly used in pirating Levis brand jeans, branded software, etc.)

The reader may first assume that banknote watermarking is effected by slight alterations to the ink color/density/distribution, etc. on the paper. This is one approach. Another is to watermark the underlying medium (whether paper, polymer, etc.) with a watermark. This can be done by changing the microtopology of the medium (a la mini-Braille) to manifest the watermark data. Another option is to employ a laminate on or within the banknote, where the laminate has the watermarking manifested thereon/therein. The laminate can be textured (as above), or its optical transmissivity can vary in accordance with a noise-like pattern that is the watermark, or a chemical property can similarly vary.

Another option is to print at least part of a watermark using photoluminescent ink. This allows, e.g., a merchant presented with a banknote, to quickly verify the presence of *some* watermark-like indicia in/on the bill even without resort to a scanner and computer analysis (e.g. by examining under a black light). Such photoluminescent ink can also print human-readable indicia on the bill, such as the denomination of a banknote. (Since ink-jet printers and other common mass-printing technologies employ cyan/magenta/yellow/black to form colors, they can produce only a limited spectrum of colors. Photoluminescent colors are outside their capabilities. Fluorescent colors—such as the yellow, pink and green dyes used in highlighting markers—can similarly be used and have the advantage of being visible without a black light.)

An improvement to existing encoding techniques is to add an iterative assessment of the robustness of the mark, with a corresponding adjustment in a re-watermarking operation. Especially when encoding multiple bit watermarks, the characteristics of the underlying content may result in some bits being more robustly (e.g. strongly) encoded than others. In an illustrative technique employing this improvement, a watermark is first embedded in an object. Next, a trial decoding operation is performed. A confidence measure (e.g. signal-to-noise ratio) associated with each bit detected in the decoding operation is then assessed. The bits that appear weakly encoded are identified, and corresponding changes are made to the watermarking parameters to bring up the relative strengths of these bits. The object is then watermarked anew, with the changed parameters. This process can be repeated, as needed, until all of the bits comprising the encoded data are approximately equally detectable from the encoded object, or meet some predetermined signal-to-noise ratio threshold.

The foregoing applications, and others, can generally benefit by multiple watermarks. For example, an object (physical or data) can be marked once in the spatial domain, and a second time in the spatial frequency domain. (It should be understood that any change in one domain has repercussions in the other. Here we reference the domain in which the change is directly effected.)

Another option is to mark an object with watermarks of two different levels of robustness, or strength. The more robust watermark withstands various types of corruption, and is detectable in the object even after multiple generations of intervening distortion. The less robust watermark can be made frail enough to fail with the first distortion of the object. In a banknote, for example, the less robust watermark serves as an authentication mark. Any scanning and reprinting operation will cause it to become unreadable. Both the robust and the frail watermarks should be present in an authentic banknote; only the former watermark will be present in a counterfeit.

Still another form of multiple-watermarking is with content that is compressed. The content can be watermarked once (or more) in an uncompressed state. Then, after compression, a further watermark (or watermarks) can be applied.

Still another advantage from multiple watermarks is protection against sleuthing. If one of the watermarks is found and cracked, the other watermark(s) will still be present and serve to identify the object.

The foregoing discussion has addressed various technological fixes to many different problems. Exemplary solutions have been detailed above. Others will be apparent to the artisan by applying common knowledge to extrapolate from the solutions provided above.

For example, the technology and solutions disclosed herein have made use of elements and techniques known from the cited references. Other elements and techniques from the cited references can similarly be combined to yield further implementations within the scope of the present invention. Thus, for example, holograms with watermark data can be employed in banknotes, single-bit watermarking can commonly be substituted for multibit watermarking, technology described as using imperceptible watermarks can alternatively be practiced using visible watermarks (glyphs, etc.), techniques described as applied to images can likewise be applied to video and audio, local scaling of watermark energy can be provided to enhance watermark signal-to-noise ratio without increasing human perceptibility, various filtering operations can be employed to serve the functions explained in the prior art, watermarks can include subliminal graticules to aid in image re-registration, encoding may proceed at the granularity of a single pixel (or DCT coefficient), or may similarly treat adjoining groups of pixels (or DCT coefficients), the encoding can be optimized to withstand expected forms of content corruption. Etc., etc., etc. Thus, the exemplary embodiments are only selected samples of the solutions available by combining the teachings referenced above. The other solutions necessarily are not exhaustively described herein, but are fairly within the understanding of an artisan given the foregoing disclosure and familiarity with the cited art.

(To provide a comprehensive disclosure without unduly lengthening the following.

We claim:

1. A method comprising:

receiving a set of sampled data;

analyzing said set of sampled data for first and second watermark information, the first watermark information being encoded relatively strongly and the second watermark information being encoded relatively weakly; and based on a result of said analysis, determining whether the set of sampled data corresponds to an original, or a degraded reproduction of an original, wherein the presence of the first but not the second watermark information indicates a conversion that has impaired the second watermark information.

2. The method of claim 1, wherein at least the first watermark is effected by slight alterations to the sampled data's color.

3. The method of claim 2, wherein the conversion comprises at least scanning and reprinting.

4. A method comprising:

receiving a set of sampled data;

analyzing said set of sampled data for first and second watermarks;

determining, based on characteristics of the two watermarks, whether the set of sampled data corresponds to an original, or a degraded reproduction of an original; and controlling operation of equipment in accordance with said determination.

5. The method of claim 4 that includes disabling an operation of said equipment in accordance with said determination.

6. The method of claim 5 that includes disabling said operation if one of said watermarks is detected and the other is not.

7. A storage medium having computer instructions stored thereon causing a computer programed thereby to perform the method of claim 4.

8. A method comprising:

receiving a set of sampled data;

analyzing said set of sampled data for first and second watermarks—one relatively frail and one relatively robust; and determining, based on a result of said analysis, whether the set of sampled data corresponds to an original, or a degraded reproduction of an original, wherein the set of sampled data corresponds to an original only if both of said watermarks are detected.

9. The method of claim 8, wherein at least the first watermark is effected by slight alterations to the data sample's color.

10. The method of claim 9, wherein a degraded original results from at least scanning and reprinting of an original.

11. A method comprising:

receiving a set of data including a first digital watermark and a second digital watermark;

analyzing the data set to determine whether the first digital watermark is present in the data set and to determine a condition of the second digital watermark; and based on the presence of the first digital watermark and the condition of the second digital watermark, determining whether the data set corresponds to an original, or to a degraded reproduction of an original.

12. The method of claim 11, wherein the sampled data corresponds to a degraded reproduction of an original when the first digital watermark is present in the data set, and the condition of the second digital watermark is at least one of degraded and undetectable.

13. A method of receiving and anaylzing sets of sampled data to differentiate copies of an original document from the original document, the document containing a first digital watermark including a first set of characteristics and a second digital watermark including a second set of characteristics, said method comprising the steps of:

receiving a first set of sampled data including the first and second watermarks from the original document and comparing the resultant values to generate a first set of results;

receiving a second set of sampled data including first and second watermarks from a copy of the original document and comparing the resulting values to generate a second set of results; and analyzing differences between the first and second sets of results to differentiate the original document from the copy of the original document.

* * * * *